United States Patent [19]

Stekelenburg

[11] Patent Number: 5,053,874
[45] Date of Patent: Oct. 1, 1991

[54] CONVERTER FOR A PHOTOGRAPHIC, SLIDE, OR CINEMATOGRAPHIC NEGATIVE-TO-TELEVISION CONVERSION

[75] Inventor: Michael A. W. Stekelenburg, Eindhoven, Netherlands

[73] Assignee: U.S. Philips Corporation, New York, N.Y.

[21] Appl. No.: 524,249

[22] Filed: May 15, 1990

[30] Foreign Application Priority Data

May 25, 1989 [NL] Netherlands ............... 8901307

[51] Int. Cl.$^5$ .................. H04N 3/36; H04N 5/253
[52] U.S. Cl. ........................ 358/214; 358/21 R; 358/216; 358/215; 358/209
[58] Field of Search .......... 358/214, 215, 216, 209, 358/53, 54, 41, 21 R, 22, 168, 169, 171, 170, 172, 461, 464, 211, 102, 76

[56] References Cited

U.S. PATENT DOCUMENTS

| | | | |
|---|---|---|---|
| 4,635,101 | 1/1987 | Nakayama | 358/76 |
| 4,786,969 | 11/1988 | Shouji | 358/171 |
| 4,811,101 | 3/1989 | Yagi | 358/171 |
| 4,912,558 | 3/1990 | Easterly et al. | 358/213.16 |
| 4,922,330 | 5/1990 | Saito et al. | 358/29 |

Primary Examiner—Howard W. Britton
Assistant Examiner—Tuan V. Ho
Attorney, Agent, or Firm—Michael E. Marion

[57] ABSTRACT

The converter comprises a pick-up device (PD) for picking up a negative (PH), a picture signal processing circuit (PC) for obtaining a picture signal via a signal inversion (IN) and fixing at a black level and a white level, which signal is suitable for display on a television display screen (TVD), and a time signal generator (TG) for supplying at least one adjusting signal (WS) to a black level adjusting circuit (BA). To realize a simple adjustment, the negative (PH) can be picked up by a sensor (FT) in the converter with a picture content part (PP) and beyond it a bright part (WP) by way of a sequential or simultaneous pick-up, respectively, while the sensor (FT) has a black level reference member (BR). Essential is the use of the adjusting gate signal (WS) for the black level adjusting circuit (BA) when the said bright part (WP) is being picked up.

20 Claims, 2 Drawing Sheets

CONVERTER FOR A PHOTOGRAPHIC, SLIDE, OR CINEMATOGRAPHIC NEGATIVE-TO-TELEVISION CONVERSION

BACKGROUND OF THE INVENTION

The invention relates to a coverter for a photographic, slide, or cinematographic negative-to-television conversion, comprising a pick-up device for picking up a photographic, slide or cinematographic negative with picture contents and for supplying a picture pick-up signal, and a picture signal processing circuit for processing the picture pick-up signal to provide a picture display signal suitable for display on a television display screen, in which signal processing operation the picture signal is inverted and fixed at a black level and a white level.

A converter of this type provides the possibility of showing photographic negatives in a positive form on the television display screen. For fixing the picture signal at the correct black and white levels, these levels must be set or adjusted. Starting from a picture pick-up signal YP, a picture display signal YD must be formed in accordance with a relation $YD = C - K \times YP$, in which C and K are constants. Assuming that a standardized black level is equal to 0 and a standardized white level is equal to 1, it follows that for a white level ($YD = 1$) to be displayed, the picked-up black level ($YP = 0$) is adjusted by means of the constant C ($YD = C = 1$). Subsequently the black level ($YD = 0$) to be displayed is adjusted by adjusting the constant K ($YD = 1 - K = 0$) in the relation $YD = 1 - K \times YP$ with the picked-up white level ($YP = 1$).

The setting or adjustment of the two constants C and K holds for monochrome television. In the case of color television with the three primary colors red (R), green (G) and blue (B) the adjustment must be effected three times, because the relations $RD = Cr - Kr \times RP$, $GD = Cg - Kg \times GP$ and $BD = Cb - Kb \times BP$ must be satisfied. Furthermore it holds for color television that the black level $Y = 0$ is present for the luminance signal $Y = 0.3R + 0.59G + 0.11B$ with $R = G = B = 0$, and the white level $Y = 1$ is present with $R = G = B = 1$.

Setting or adjusting the two constants in monochrome television is required for obtaining the correct black and white in the displayed picture and the correct contrast range therein. Moreover, it is essential for color television to correctly set or adjust all six constants for obtaining the correct colors upon display. In practice it is found that, starting from the displayed color picture, it is substantially impossible to find the correct six constant values by way of experiment due to the mutual influences of displayed color and luminance. In addition, the photographic films made by the various film manufacturers require different, adapted values for the constants, while each film type has its own spread.

SUMMARY OF THE INVENTION

It is inter alia an object of the invention to realize a converter of the type described with which a simple setting or adjustment can be performed in practice. To this end a converter according to the invention is characterized in that for performing a black level adjustment the negative can be picked up by the pick-up device in the converter with a picture content part and beyond this with a bright part by way of a sequential or simultaneous pick-up, respectively, an adjusting gate signal being supplied to a black level adjusting circuit to enable it when said bright part is being picked up.

In this case there is essentially an automatic black level adjustment, while a white level setting or adjustment can be effected manually or automatically, using a black reference member present on the sensor of the pick-up device. A converter according to the invention, also using an automatic white level adjustment is further characterized in that the time signal generator is provided for further supplying an adjusting gate signal to a white level adjusting circuit, namely when the said black level reference signal is being supplied.

BRIEF DESCRIPTION OF THE DRAWINGS

The invention will now be described in greater detail by way of example with reference to the accompanying drawings in which.

DETAILED DESCRIPTION OF THE PREFERRED EMBODIMENTS OF THE INVENTION

Figure 1:
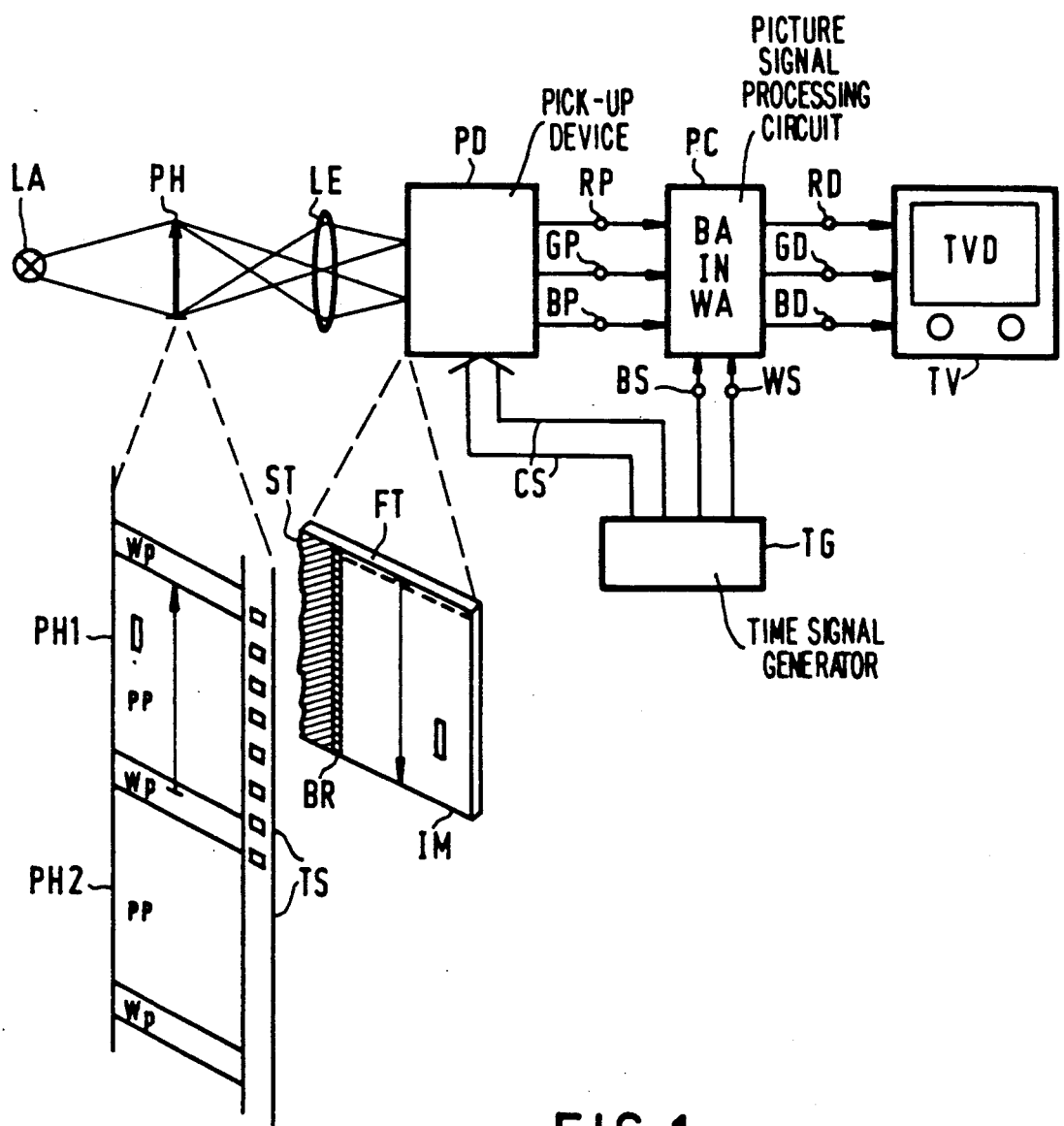
FIG. 1 is a block-schematic diagram of a converter according to the invention with an elevational view of a photographic, slide, or cinematographic negative and a sensor.

In the converter of FIG. 1, which is suitable for a photographic, slide or cinematographic negative-to-television conversion, the reference PD denotes a pick-up device. The device PD is suitable as a television pick-up device for monochrome television or color television. FIG. 1 shows the color television version in which the pick-up device PD supplies three color signals red (R), green (G) and blue (B) as the respective picture pick-up signals RP, GP and BP to output terminals denoted by the same references. These color signals may originate in known manner from three sensors which are present in the device PD in front of which sensors a color splitter is arranged, or from one sensor in front of which a strip-shaped or mosaic color filter is arranged.

The information to be picked up originates from a photographic, slide or cinematographic negative denoted by PH. The negative PH is exposed by means of a light source denoted by LA, while the projected and on-going light is focused via a system of lenses LE illustrated by means of a single lens on one or more sensors in the device PD. FIG. 1 shows as an example a possible embodiment of the sensor with a diagrammatic elevational view of the sensor. A frame transfer sensor FT is shown by way of example. At the sensor FT the reference IM denotes a picture pick-up member, BR denotes a black level reference member and the reference ST denotes a storage member, the shaded members BR and ST being shielded from light. For a detailed description of the FT sensor reference is made to the Philips'data handbook "Solid-State Image Sensors and Peripheral Integrated Circuits" of March 1987. Independent of the specific sensor version it is assumed that the pick-up device PD supplies the signals RP, GP and BP with a black level reference signal therein which originates from the black level reference member BR.

An arrow and a rectangle are shown at the pick-up member IM. A corresponding arrow and rectangle are shown in an elevational view on the negative PH. The negative PH is shown by way of example with two picture negatives PH1 and PH2 and successively the reference PP denotes a picture content part and WP denotes a bright part. The bright part WP is the internegative space. During the photographic, slide or cinematographic recording of a scene this film part is not exposed in the photographic or cinematographic device and this bright part is thus a reference for black in the scene. The negative PH is shown with a transport strip TS by which successively picture negatives PH1, PH2, etc. can be moved in front of the sensor FT. The picture negative PH1 illustrates that the base of the arrow lies in the bright part WP. The strip of the bright part WP picked up by the sensor FT is denoted by a broken line in the pick-up member FT. The picture content part PP and the bright part WP are (partly) picked up simultaneously by the sensor FT. At this simultaneous pick-up the strip of the pick-up member IM illustrated by means of the broken line is sacrificed with respect to the picture negative pick-up. Another possibility of picking up the bright part WP is a sequential pick-up. At the adjustment a bright part WP can be placed separately in front of the sensor FT while in known manner an electronic window is generated in this part and the sensor FT ensures the separate pick-up of the bright part WP. One single pick-up is sufficient for all picture negatives PH1, PH2 etc. of the cinematographic negative PH.

FIG. 1 shows that the negative is picked up by the pick-up device PD under the control of signals CS from a time signal generator TG. Furthermore the generator TG supplies adjusting signals BS and WS to input terminals, which have the same references, of a picture signal processing circuit PC according to the invention which is coupled to the output terminals RP, GP and BP with the picture pick-up signals having the same references. The circuit PC processes the applied picture pick-up signals to picture display signals RD, GD and BD which become available at output terminals denoted by the same references. The picture signal processing circuit PC essentially operates with a signal inversion IN, a signal fixing at a black level and a signal fixing at a white level. The required black level adjustment is denoted by BA and the white level adjustment is denoted by WA at the circuit PC, the signals WS and BS being used as respective adjusting gate signals. The automatic black level adjustment by means of the adjusting gate signal WS is essential, while the white level can be set or adjusted manually. The picture signal processing with the signal inversion and fixing is denoted by (BA, IN, WA). The output terminals conveying the picture display signals RD, GD and BD are coupled to a television display device TV, while the reference TVD denotes a display screen. The negative PH is shown in a positive form on the screen TVD with the correct colors and contrasts after the adjustment in the picture signal processing circuit PC. According to FIG. 2 this is effected by supplying the adjusting gate signal WS which occurs when the bright part WP is picked up, for the black level adjustment BA, and by supplying the adjusting gate signal BS which occurs when the black level reference signal is supplied for the white level adjustment WA.

Figure 2:
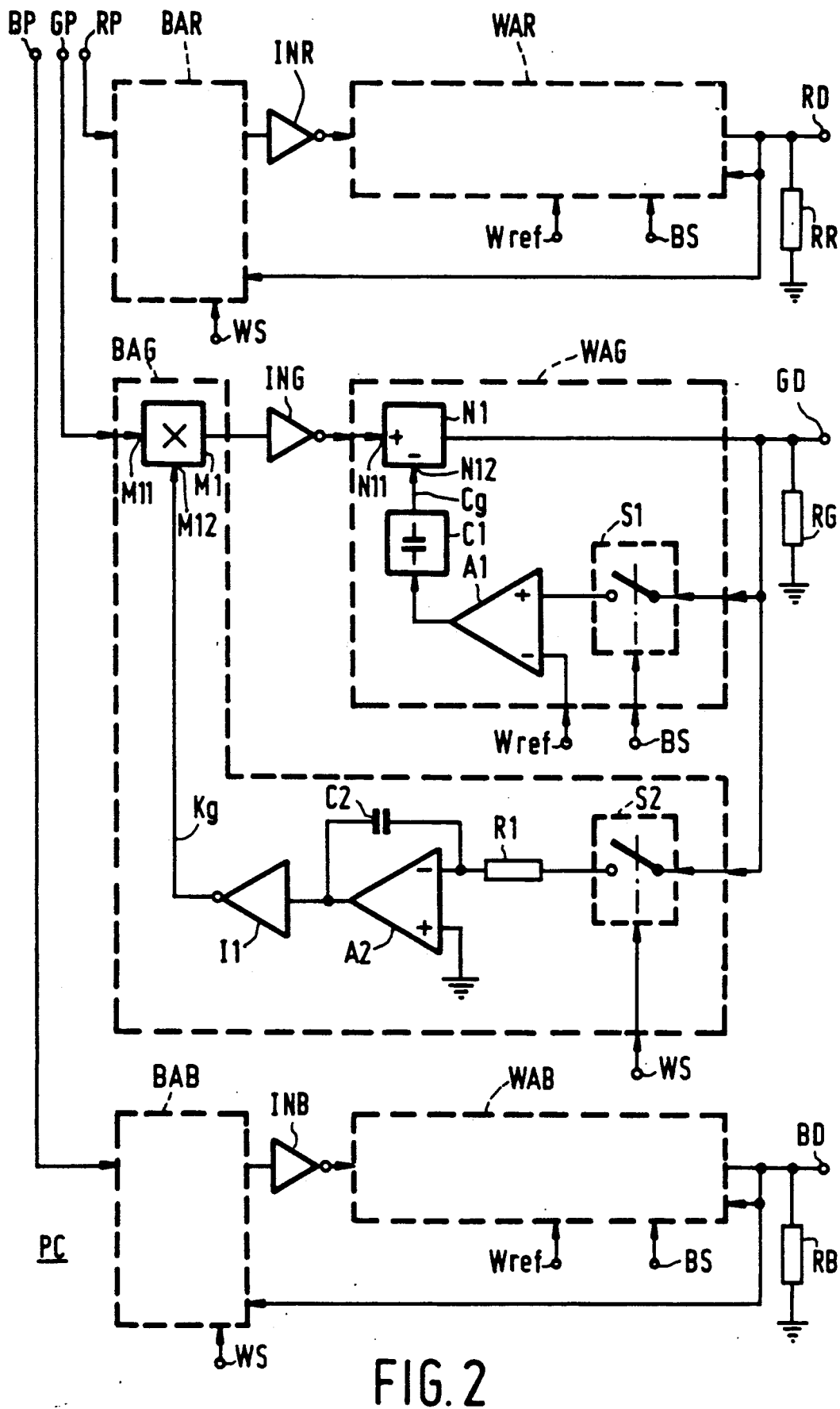
FIG. 2 shows a circuit diagram for a picture signal processing circuit according to the invention, suitable for, inter alia color television.

FIG. 2 shows a circuit diagram by way of example for the picture signal processing circuit PC of FIG. 1. The terminals conveying the picture pick-up signals RP, GP and BP, the picture display signals RD, GD and BD and the adjusting gate signals BS and WS of FIG. 1 are shown in FIG. 2. Terminals conveying a white level reference voltage Wref have been added.

The circuit PC of FIG. 2 has a triple design with a series arrangement of a black level adjusting circuit (BAR, BAG and BAB), an inverter circuit (INR, ING and INB) and a white level adjusting circuit (WAR, WAG and WAB). The adjusting gate signal BS which occurs when the black reference signal is supplied and the white level reference voltage Wref are applied to the white level adjusting circuits WA. The adjusting gate signal WS which occurs when the said bright part is picked up, is applied to the black level adjusting circuits BA. The output terminals RD, GD and BD are connected to ground via resistors RR, RG and RB, respectively. The resistors RR, RG and RB have a standardized value such as, for example 75 Q. It is assumed that a voltage value of 700 mV across these standardized resistors RR, RG and RB is associated with the white level in accordance with the standard. The ground potential of 0 V is associated with the black level. FIG. 2 shows that the terminals RD, GD and BD are fed back to the circuits WAR, and BAR, WAG and BAG and WAB and BAB, respectively.

FIG. 2 shows a series arrangement (BAG, ING, WAG) in detail by way of example. The picture inversion could also occur at other parts of the circuit. Also, it is possible that the type of circuit described below for black level adjustment be used for white level, and vice versa. A multiplier circuit M1 is present between the input and output of the black level adjusting circuit BAG. A first input M11 of the circuit M1 is coupled to the input terminal GP, and a second input M12 receives an adjusting voltage which will prove to correspond to the constant Kg. The output of the circuit M1 is coupled to an input of the inverter circuit ING. A superposition circuit N1 is arranged between an input and output of the white level adjusting circuit WAG. A first input N11 of the circuit N1 is coupled to the output of the inverter circuit ING, and a second input N12 receives an adjusting voltage which will prove to correspond to the constant Cg. The output of the circuit N1 is coupled to the output terminal GD.

The output terminal GD is fed back to the second input N12 via a switching circuit S1, a comparison circuit A1 in the form of a differential amplifier, and a memory circuit C1. The adjusting gate signal BS is applied to a switching input of the switching circuit S1. For the sake of simplicity the switching circuit S1 is shown by way of a mechanical switch, but in practice it is in the form of an electronic switch. A (+) input of the circuit A1 is coupled to the switching circuit S1 and a (−) input receives the white level reference voltage Wref. The memory circuit C1 following circuit A1 is shown with one capacitance for the purpose of illustration.

Furthermore the output terminal GD is fed back to the second input M12 via a switching circuit S2, a resistor R1, a comparison circuit (A2, C2) in the form of an integrating differential amplifier, and an inverter circuit I1. The adjusting gate signal WS is applied to a switching input of the switching circuit S2. A (−) input of the comparison circuit A2 is connected to the resistor R1 and is connected to its output via an integration capacitor C2. A (+) input of the circuit A2 is connected to ground, with the ground potential as a reference voltage. An integration circuit (A2, C2, R1) thus formed, which can further be designated as a comparison and memory circuit, is comparable with the combination of the circuits A1 and C1 as far as its operation is concerned.

The adjustment is to be effected at the relation $GD = Cg - Kg \times GP$. Starting from the standardized white level of 700 mV across the standard resistor RG of 75 Q, it follows that with Wref = 700 mV and with the supply of the black level reference signal during the adjusting gate signal BS, the constant Cg is adjusted by means of a corresponding adjusting voltage at which the 700 mV is present across 75 Q. If it has further been standardized that the relation GP = 0 V must then hold, the series arrangement (S1, A1, C1) can be dispensed with and only the circuit C1 which is settable may suffice. When presenting GP = 0 V to the terminal GP, the circuit C1 is adjusted until it holds that GD = 700 mV. A potentiometer circuit for supplying the constant Cg is mentioned as an embodiment for the memory circuit C1. Subsequently the black level can be adjusted. A bright part WP according to FIG. 1 is then picked up, either or not with the aid of a separate window signal during the presence of the adjusting gate signal WS. An increase of the signal GD corresponds to an increase of both constants Cg and Kg and thus to a decrease of the output signal of the circuit N1. The supply to the (−) input N12 of the circuit N1 corresponds to the inverting action of the circuit ING, and conversely.

It appears that the black level adjustment must be effected automatically by means of the multiplier circuit M1, while the white level can be set or adjusted manually or automatically, dependent on standardized or non-standardized values. The signal multiplication may be effected in the form of a logarithmic superposition.

Over or underexposed negatives can be corrected by multiplying the adjusted constants Kr, Kg and Kb by one and the same factor.

I claim:

1. A converter for a photographic, slide, or cinematographic negative-to-television conversion, comprising a pick-up device for scanning of a photographic, slide or cinematographic negative having picture contents and for supplying corresponding picture pick-up signals, and a picture signal processing circuit for processing the picture pick-up signals to create picture display signals suitable for display on a television display screen, in which picture signal processing circuit the picture pick-up signals are inverted and fixed at a black level and a white level, wherein said photographic, slide or cinematographic negative comprises a picture content part and a bright reference part and said pick-up device scans said bright reference part so that said picture pick-ups signals include a picture content part signal and a bright reference part signal; and wherein said picture signal processing circuit comprises a black level adjusting circuit for setting said black level, said black level adjusting circuit being activated by receipt of a first adjusting gate signal, said first adjusting gate signal being provided when said bright reference part signal is applied to said picture signal processing circuit.

2. A converter as claimed in claim 1, wherein the pick-up device comprises a sensor having a black level reference member, a corresponding black level reference signal being supplied by said pick-up device, said picture signal processing circuit further comprising a white level adjusting circuit operative in response to a second adjusting gate signal, said second adjusting gate signal being applied to said white level adjusting circuit when said black level reference signal is applied to said picture signal processing circuit.

3. A converter as claimed in claim 2, wherein the output of the picture signal processing circuit is fed back to the second output of the superposition circuit via a switching circuit having a switching control input for receiving the adjusting gate signal which occurs when the black level reference signal is supplied, a subsequent comparison circuit having an input for receiving a white level reference voltage, and a memory circuit subsequent thereto.

4. A converter as claimed in claim 1, wherein a time signal generator supplies said first and second adjusting gate signals to said black level adjustment circuit and said white level adjustment circuit, respectively.

5. A converter as claimed in claim 4, wherein the output of the picture signal processing circuit is fed back to the second input of the superposition circuit via a switching circuit having a switching control input for receiving the adjusting gate signal which occurs when the black level reference signal is supplied, a subsequent comparison circuit having an input for receiving a white level reference voltage, and a memory circuit subsequent thereto.

6. A converter as claimed in claim 1, wherein said bright reference part is unexposed negative.

7. A converter as claimed in claim 6, wherein the output of the picture signal processing circuit is fed back to the second input of the superposition circuit via a switching circuit having a switching control input for receiving the adjusting gate signal which occurs when the black level reference signal is supplied, a subsequent comparison circuit having an input for receiving a white level reference voltage, and a memory circuit subsequent thereto.

8. A converter as claimed in claim 1, wherein said picture signal processing circuit comprises a series arrangement of the black level adjusting circuit, and the white level adjusting circuit.

9. A converter as claimed in claim 8, wherein said black level adjusting circuit comprises a multiplier circuit having a first input which is coupled to the input of the picture signal processing circuit, a second input for receiving an adjusting voltage, and an output.

10. A converter as claimed in claim 9, wherein the output of the picture signal processing circuit is fed back to the second input of the multiplier circuit via a switching circuit having a control input for receiving the adjusting gate signal occurring when said bright part is scanned, and a subsequent comparison and memory circuit.

11. A converter as claimed in claim 9, wherein the white level adjusting circuit comprises a superposition circuit having a first input which is coupled to an output of the black level adjusting circuit, a second input for receiving an adjusting voltage, and an output coupled to the output of the signal processing circuit which is connected to a resistor having a standardized value.

12. A converter as claimed in claim 9, wherein the output of the picture signal processing circuit is fed back to the second input of the superposition circuit via a switching circuit having a switching control input for receiving the adjusting gate signal which occurs when the black level reference signal is supplied, a subsequent comparison circuit having an input for receiving a white level reference voltage, and a memory circuit subsequent thereto.

13. A converter as claimed in claim 10, wherein said comparison and memory circuit comprises an integration circuit.

14. A converter as claimed in claim 10, wherein the white level adjusting circuit comprises a superposition circuit having a first input which is coupled to an output of the black level adjusting circuit, a second input for receiving an adjusting voltage, and an output coupled to the output of the signal processing circuit which is connected to a resistor having a standardized value.

15. A converter as claimed in claim 13, wherein the white level adjusting circuit comprises a superposition circuit having a first input which is coupled to an output of the black level adjusting circuit, a second input for receiving an adjusting voltage, and an output coupled to the output of the signal processing circuit which is connected to a resistor having a standardized value.

16. A converter as claimed in claim 15, wherein the output of the picture signal processing circuit is fed back to the second input of the superposition circuit via a switching circuit having a switching control input for receiving the adjusting gate signal which occurs when the black level reference signal is supplied, a subsequent comparison circuit having an input for receiving a white level reference voltage, and a memory circuit subsequent thereto.

17. A converter as claimed in claim 8, wherein the white level adjusting circuit comprises a superposition circuit having a first input which is coupled to an output of the black level adjusting circuit, a second input for receiving an adjusting voltage, and an output coupled to the output of the signal processing circuit which is connected to a resistor having a standardized value.

18. A converter as claimed in claim 17, wherein the output of the picture signal processing circuit is fed back to the second input of the superposition circuit via a switching circuit having a switching control input for receiving the adjusting gate signal which occurs when the black level reference signal is supplied, a subsequent comparison circuit having an input for receiving a white level reference voltage, and a memory circuit subsequent thereto.

19. A converter as claimed in claim 8, wherein the output of the picture signal processing circuit is fed back to the second input of the superposition circuit via a switching circuit having a switching control input for receiving the adjusting gate signal which occurs when the black level reference signal is supplied, a subsequent comparison circuit having an input for receiving a white level reference voltage, and a memory circuit subsequent thereto.

20. A converter as claimed in claim 1, wherein the output of the picture signal processing circuit is fed back to the second input of the superposition circuit via a switching circuit having a switching control input for receiving the adjusting gate signal which occurs when the said black level reference signal is supplied, a subsequent comparison circuit having an input for receiving a white level reference voltage, and a memory circuit subsequent thereto.

* * * * *